(12) United States Patent
Lojewski

(10) Patent No.: US 8,014,568 B2
(45) Date of Patent: Sep. 6, 2011

(54) METHOD FOR COMPUTER-AIDED IDENTIFICATION OF THE CHILD OCTANTS OF A PARENT OCTANT, WHICH ARE INTERSECTED BY A BEAM, IN AN OCTREE DATA STRUCTURE BY MEANS OF LOOK-UP TABLES

(75) Inventor: Carsten Lojewski, Kaiserslautern (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 931 days.

(21) Appl. No.: 11/957,679

(22) Filed: Dec. 17, 2007

(65) Prior Publication Data
US 2009/0016598 A1 Jan. 15, 2009

(30) Foreign Application Priority Data

Dec. 22, 2006 (DE) .......................... 10 2006 061 325

(51) Int. Cl.
*G06K 9/00* (2006.01)
*G06T 15/00* (2011.01)
(52) U.S. Cl. .......................... 382/103; 382/240; 345/419
(58) Field of Classification Search .................. 382/100, 382/103, 107, 123, 128, 154, 168, 171, 173, 382/181, 189, 193–195, 201, 232, 240, 254, 382/274, 276, 285, 287, 291, 302, 305, 312; 345/440, 419, 421, 422; 715/763
See application file for complete search history.

(56) References Cited

U.S. PATENT DOCUMENTS

| 4,945,500 | A | * | 7/1990 | Deering | 345/422 |
| 5,394,516 | A | * | 2/1995 | Winser | 345/419 |
| 5,490,246 | A | * | 2/1996 | Brotsky et al. | 715/763 |
| 6,166,742 | A | * | 12/2000 | He | 345/421 |
| 6,597,359 | B1 | * | 7/2003 | Lathrop | 345/440 |
| 7,042,448 | B2 | * | 5/2006 | Kunimatsu et al. | 345/419 |

OTHER PUBLICATIONS

James D. Foley et al.: "Grundlagen der Compoutergraphik", Basics of Computer Graphics pp. 434-525 (1994).
German Office Action dated Mar. 20, 2007 for International Application DE102006061325.2
Mark W. Jones: "Acceleration Techniques for Volume Rendering", pp. 253-286.
James D. Foley et al.: "Grundlagen der Compoutergraphik", pp. 434-525 (1994).
German Office Action dated Mar. 20, 2007 for International Application DE102006061325.2.

* cited by examiner

*Primary Examiner* — Seyed Azarian
(74) *Attorney, Agent, or Firm* — Matthew B. Dernier, Esq.; Gibson & Dernier LLP

(57) ABSTRACT

The present invention relates to a method for computer-aided identification of the child octants of a parent octant, which are intersected by a beam, in an octree data tree. The method firstly determines the number of the child octants of the parent octant which are intersected by the beam and, on the basis thereof, the child octants of the parent octant which are intersected by the beam. It is characterized in that, for determination of intermediate octants which do not correspond to the entry and the exit octant and nevertheless are intersected by the beam, look-up tables are used for identification.

11 Claims, 3 Drawing Sheets

```
table3[1]=4            table3[4]=2
table3[3]=2            table3[5]=1
table3[9]=5            table3[12]=3
table3[11]=3           table3[13]=0
table3[17]=6           table3[20]=0
table3[19]=0           table3[21]=3
table3[25]=7           table3[28]=1
table3[27]=1           table3[29]=2
table3[33]=0           table3[36]=6
table3[35]=6           table3[37]=5
table3[41]=1           table3[44]=7
table3[43]=7           table3[45]=4
table3[49]=2           table3[52]=4
table3[51]=4           table3[53]=7
table3[57]=3           table3[60]=5
table3[59]=5           table3[61]=6
table3[2]=1
table3[6]=4
table3[10]=0
table3[14]=5
table3[18]=3
table3[22]=6
table3[26]=2
table3[30]=7
table3[34]=5
table3[38]=0
table3[42]=4
table3[46]=1
table3[50]=7
table3[54]=2
table3[58]=6
table3[62]=3
```

Fig. 3

```
table4[1][0]=1      table4[29][0]=7     table4[59][0]=6
table4[1][1]=5      table4[29][1]=6     table4[59][1]=4
table4[2][0]=2      table4[30][0]=1     table4[60][0]=3
table4[2][1]=3      table4[30][1]=5     table4[60][1]=1
table4[3][0]=1      table4[33][0]=5     table4[61][0]=3
table4[3][1]=3      table4[33][1]=1     table4[61][1]=2
table4[4][0]=4      table4[34][0]=6     table4[62][0]=5
table4[4][1]=6      table4[34][1]=7     table4[62][1]=1
table4[5][0]=4      table4[35][0]=5     table4[58][0]=5
table4[5][1]=5      table4[35][1]=7     table4[58][1]=4
table4[6][0]=2      table4[36][0]=0     table4[28][0]=7
table4[6][1]=6      table4[36][1]=2     table4[28][1]=5
table4[9][0]=0      table4[37][0]=0
table4[9][1]=4      table4[37][1]=1
table4[10][0]=3     table4[38][0]=6
table4[10][1]=2     table4[38][1]=2
table4[11][0]=0     table4[41][0]=4
table4[11][1]=2     table4[41][1]=0
table4[12][0]=5     table4[42][0]=7
table4[12][1]=7     table4[42][1]=6
table4[13][0]=5     table4[43][0]=4
table4[13][1]=4     table4[43][1]=6
table4[14][0]=3     table4[44][0]=1
table4[14][1]=7     table4[44][1]=3
table4[17][0]=3     table4[45][0]=1
table4[17][1]=7     table4[45][1]=0
table4[18][0]=0     table4[46][0]=7
table4[18][1]=1     table4[46][1]=3
table4[19][0]=3     table4[49][0]=7
table4[19][1]=1     table4[49][1]=3
table4[20][0]=6     table4[50][0]=4
table4[20][1]=4     table4[50][1]=5
table4[21][0]=6     table4[51][0]=7
table4[21][1]=7     table4[51][1]=5
table4[22][0]=0     table4[52][0]=2
table4[22][1]=4     table4[52][1]=0
table4[25][0]=2     table4[53][0]=2
table4[25][1]=6     table4[53][1]=3
table4[26][0]=1     table4[54][0]=4
table4[26][1]=0     table4[54][1]=0
table4[27][0]=2     table4[57][0]=6
table4[27][1]=0     table4[57][1]=2
```

Fig. 4

METHOD FOR COMPUTER-AIDED IDENTIFICATION OF THE CHILD OCTANTS OF A PARENT OCTANT, WHICH ARE INTERSECTED BY A BEAM, IN AN OCTREE DATA STRUCTURE BY MEANS OF LOOK-UP TABLES

BACKGROUND

The present invention relates to a method for computer-aided identification of the child octants of a parent octant, which are intersected by a beam, in an octree data structure. The invention relates in addition also to methods which are described subsequently in more detail, said methods being based on the method according to the invention and using it in different technical fields, to the use of such methods and also to a computer system which is configured to achieve the method according to the invention.

An octree (lat. oct "8" and English tree) is a data structure known from information technology. An octree can be regarded as a tree with a root, the nodes of which respectively have either exactly 8 direct successors or no successor at all. Octrees are used mainly in computer graphics in order to subdivide three-dimensional data sets hierarchically. The root of the octree thereby represents all the data, each other node represents an octant of the data of its direct predecessor. The root or a predecessor are subsequently also termed parent octant alternatively. The subsequent nodes of a predecessor are subsequently termed also child octants. Each parent octant has hence either exactly 8 child octants or no child octant. Subsequently, the term octant or node is used synonymously or alternatively to the information which can be stored in such a node within the framework of the octree data structure. Thus, for example each parent octant of the special expression min-max-octree can contain the minimum and the maximum of the successive partial tree (i.e. of the 8 assigned child octants), which enables efficient search algorithms. The individual data values which are stored in the individual nodes or octants correspond thereby to values, such as for example real numbers, which can be compared with each other with a size relation. Thus the individual stored values can represent for example the density of a physical medium.

The most frequent application of an octree, as used in the invention, relates to the uniform division of a cube-shaped data set: the root (or that parent octant which is highest in the hierarchy) is subdivided into 8 smaller cubes, the child octants. Each child octant is then divided in turn into a further 8 grandchild octants etc. The subdivision of a partial cube ends hereby when no further division is possible or if no further division is necessary.

The individual children volumes produced by the division (by means of corresponding dividing planes which are disposed for example perpendicular to the individual coordinate axes x, y and z of a Cartesian coordinate system) need not however be cube-shaped but can also in general have a cuboid configuration. A subdivision of the volumes into parts of an unequal size is also possible.

SUMMARY OF THE INVENTION

The present invention now relates to a method for computer-aided identification of the child octants of a parent octant, which are intersected by a beam, in such an already described octree data structure, i.e. to the so-called octree traversing. There is understood subsequently by octree traversing the process with which precisely that sub-quantity of child octants (or voxels of the three-dimensional data structure) is discovered which is intersected by a beam (directed vector in three-dimensional space). In such a case, the octree is used as a spatial index. Each voxel or each parent octant holds a pointer to the sub-quantity of objects (child octants) which it intersects or contains. Accordingly, the quantity of objects which are struck or are intersected by the beam is necessarily contained in the quantity of object-intersecting voxels which are struck by the beam. In that an octree traversing, as the method according to the invention proposes, is implemented, it is possible to restrict beam-object intersection tests to the last-mentioned objects.

Octree traversing methods such as the method according to the invention can be used in a large number of application fields:
 in the field of graphic display of objects (in particular: three-dimensional physical objects) by means of a computer, in particular for example shadow calculations, visualisations (volume rendering, volumetric ray tracing and/or global illumination),
 in the field of spatial indexing, in particular in geographical information systems,
 in the field of simulation of physical and/or chemical processes, such as for example the grouping of particles in molecular dynamics,
 in the field of hidden surface removal of terrain data, e.g. in long-distance reconnaissance,
 in the field of collision recognition in computer simulations of solid body objects, for example in solid body modelling or also in 3D computer games,
 in the field of solid body modelling where the individual octants then can contain for example different density values,
 in the field of calculation of energy distribution in space,
 in the field of search and/or sorting algorithms of size-comparable data values.

Since in the previously mentioned application fields the individual three-dimensional data sets are normally very comprehensive, a very essential aspect in the case of an octree traversing method is the efficiency or rapidity of the subdivision of the geometric space into the 8 sub-spaces and rapid calculation of those of the 8 sub-spaces or child octants of a parent octant which are intersected by a prescribed beam. As can be hereby considered easily, in the case of a prescribed beam and prescribed child octant subdivision of the parent octant (which can be cube-shaped or in general cuboid) by means of corresponding dividing planes into the 3 spatial directions of a Cartesian coordinate system (x, y, z), the number of child octants which are intersected by the beam is restricted to the values 0, 1, 2, 3, or 4.

It is hence the object of the present invention to make available a method (or a corresponding computer system) with which the child octants which are intersected by the beam can be identified in the fastest and simplest manner possible.

This object is achieved by the method according to claim 1 and also a computer system according to claim 10. Advantageous developments of this method are found in the dependent claims. The uses of the method according to the invention can be deduced from claim 11.

The basis of the solution, according to the invention, of the object is the splitting of the octree traversing problem into a plurality of partial problems and the replacement of running time calculations by pre-calculated look-up tables (LUTs, English look-up tables) which are stored in a data memory of the computer system which is used before implementation of the actual octree traversing. In crucial method steps, instead of the slow floating-point arithmetic of the computer system, the rapid integer-arithmetic of the computer system can hence be used.

The solution according to the invention has hence, in addition to improved efficiency or more rapid running time, the advantage that the method is easy to vectorise and hence can profit better then conventional methods from current processor developments.

The method according to the invention is described subsequently firstly with respect to its essential features. A general embodiment follows this. Finally, after the description of the general embodiment there are also short descriptions of application methods according to the invention, within the scope of which the presented octree traversing method can be used.

Within the scope of the subsequent notations, the 8 individual child octants of one parent octant are differentiated from each other with the help of index numbers or indices ID. This index number can be chosen both as a decimal number, here then advantageously 0 to 7, but equally also as a corresponding 3-place bitmask of a binary number (here then 000 to 111). The term index or ID is used subsequently as an alternative for both notational forms in order to identify a corresponding child octant. It is hereby clear for the person skilled in the art from the respective context which notational form is respectively intended.

Subsequently the notation, known to the person skilled in the art, "A>B" for boolean values is likewise used ("A>B" thereby corresponds to the logical value when the value of A is greater than the value of B etc.). The notation "<<x" is used correspondingly, as is known to the person skilled in the art, in order to implement a bit shift (here by x bit to the left).

In the case of the octree traversing according to the invention, firstly the number a of those child octants of a parent octant which are intersected by a prescribed beam is established. On the basis of this established number a (or a value in direct correlation with this number such that a can be derived unequivocally from this value), the possible 0 to 4 child octants which are intersected by the beam are identified. This takes place according to the invention in that, in the cases a=3 and a=4, i.e. when in addition to the entry octants and the exit octants of the beam which are different therefrom, precisely one further intermediate octant or precisely two further intermediate octants are intersected by the beam, at least one pre-calculated look-up table is used which is stored in advance in the memory of the computer system which is used.

The use of the look-up table thereby takes place preferably such that, from prescribed geometric values (in particular the beam direction d, the beam origin o and also the dividing planes PlaneX, PlaneY and PlaneZ which subdivide the parent octant into the 8 child octants), corresponding integer index values are calculated which are then used as an index for access to the look-up arrays stored in the memory.

Advantageously, two different look-up tables are used in the invention: in the case a=3, a first look-up table (LUT), in the case a=4 a second LUT. Advantageously the first LUT hereby concerns a one-dimensional LUT, the second a two-dimensional one.

Establishing or indexing a specific child octant (for example the entry octant) hereby takes place advantageously via a three-place bitmask ($ID_{in}$ for the entry octant and correspondingly $ID_{out}$ for the exit octant of the beam). This advantageous notation makes it possible that the number a (or an integer flag value, subsequently cFlag, from which this number can be calculated unequivocally) can be calculated in a simple manner in that the bitmask of the entry octant and the bitmask of the exit octant are subjected bitwise to an XOR cross-linkage. It is then possible to establish with reference to the number a or the flag value cFlag whether in addition to the entry and the exit octant also one or two further intermediately situated child octants (including cells) are struck by the beam so that, for these cases as described subsequently more precisely, initially an index value can be calculated by means of the previously mentioned geometric values and via which access can then be made in a simple and rapid manner to the look-up tables.

BRIEF DESCRIPTION OF THE DRAWINGS

FIG. 3 shows a first LUT and
FIG. 4 shows a second LUT.

DETAILED DESCRIPTION OF THE INVENTION

The present invention is now represented subsequently firstly with reference to a general embodiment.

Figure 1:
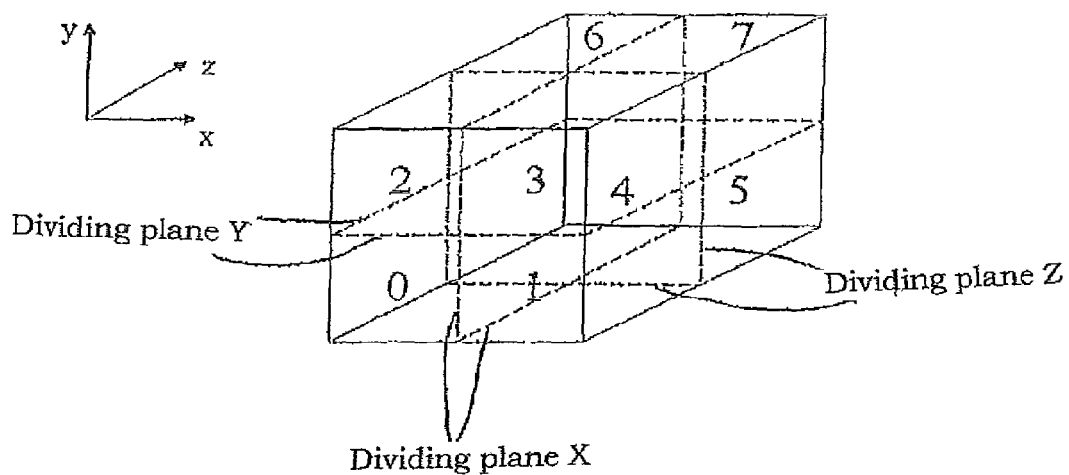
FIG. 1 hereby shows the spatial indexing which is used.

FIG. 1 shows the spatial indexing used in the embodiment. A left-handed Cartesian coordinate system is shown, in which a shown parent octant (cube represented in continuous lines) is subdivided by isotropically disposed dividing planes PlaneX, PlaneY and PlaneZ into 8 child octants of equal size (small cubes 0 to 7). The indexing is hereby implemented hierarchically rising (from 0 to 7) first in the direction of the positive x axis, thereupon in the direction of the positive y axis, thereupon in the direction of the positive z axis. The dividing planes X, Y and Z (or PlaneX, PlaneY and PlaneZ) can however be disposed just as well anisotropically. In the present case, the child octants of the parent octant are indexed hence by an ordered, sequential subdivision of the space according to a left-handed Cartesian coordinate system (here: x, y, z coordinate arrangement). However other indexing types are possible, for example a corresponding right-handed system with z, y, x arrangement. The LUTs which are used in the present invention must then be generated correspondingly adapted.

Figure 2:
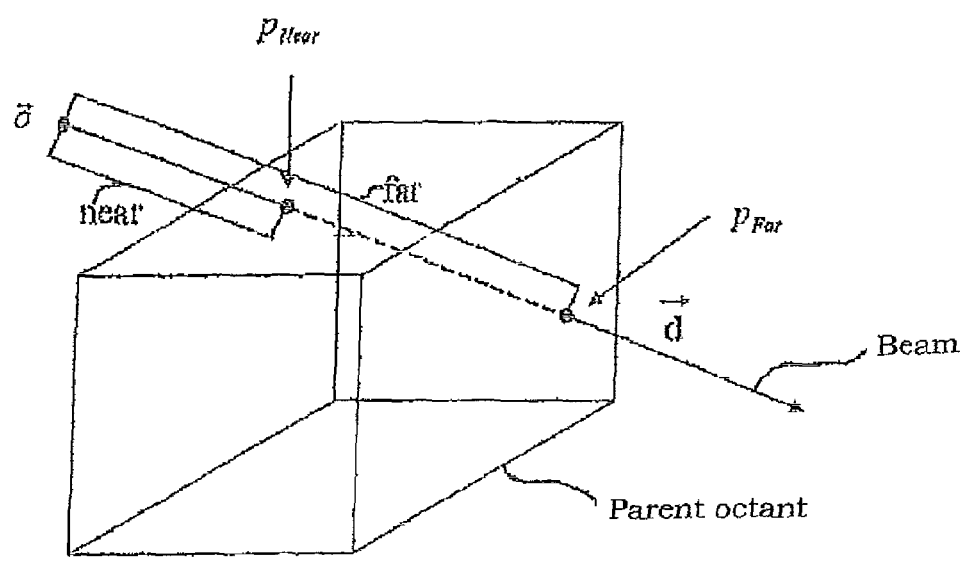
FIG. 2 sketches the operational values and parametric values which are used.

Starting from the indexing shown in FIG. 1, that ordered sequence of cells is hence sought which is produced by intersection points of a given beam with the 8 sub-volumes of the illustrated parent octree object. For this purpose, the following operational values or geometric characteristic values are used (see FIG. 2):

| | |
|---|---|
| $\bar{o} = (O_X, O_Y, O_Z)$: | beam origin of the beam |
| $\bar{d} = (d_X, d_Y, d_Z)$: | beam direction (unit directional vector) of the beam |
| $\bar{d}\,\text{Inv} = \left(\dfrac{1}{d_X}, \dfrac{1}{d_Y}, \dfrac{1}{d_Z}\right)$ | 1/d (inverted directional vector) |
| near: | spacing from the origin to the entry surface |
| far: | spacing from the origin to the exit surface |
| planeX: | dividing plane X or X coordinate of this plane |
| planeY: | dividing plane Y or Y coordinate of this plane |
| planeZ: | dividing plane Z or Z coordinate of this plane. |

There hereby applies for the parametrisation of a point $\bar{p}$ on the beam ($t \in \mathbb{R}$):

$$\bar{p} = \bar{o} + t \cdot \bar{d}$$

In a first step, now the entry point of the beam in the entry child octants and the entry cell are calculated firstly (and also the index of the entry cell):
calculation of the entry point $\bar{p}_{Near}$:

$$p_{NearX}=O_X+\text{near}*d_X$$

$$p_{NearY}=O_Y+\text{near}*d_Y$$

$$p_{NearZ}=O_Z+\text{near}*d_Z$$

Next the index of the entry cell ($ID_{in}$) is calculated:

$$\text{bit0}=p_{NearX}>\text{plane}X$$

$$\text{bit1}=p_{NearY}>\text{plane}Y$$

$$\text{bit2}=p_{NearZ}>\text{plane}Z$$

From the bitmask in a bitmask (bit2 bit1 bit0) corresponding to the index $ID_{in}$ there is produced now directly the index of the entry cell in decimal notation (integer in [0, ..., 7]). If the beam terminates within this cell then the traversal method can likewise be stopped at this point.

Whether and how the beam terminates depends thereby upon the concrete application case: thus it is possible for example that (seen from the observer) a first collision object leads to termination of the beam. It is likewise possible that a first graphic object between the viewer and a light source (again seen from the observer) terminates the beam. A further possibility resides in a so-called integration saturation (user-defined) terminating the beam (for example integration can take place along the beam and then, if a user-defined threshold value is reached, terminates the beam; this is called in this case so-called early-ray-termination ERT, i.e. further scanning of the beam would in such a case not lead to any significant improvement in the result).

If the beam does not terminate within the entry cell, the exit point $\bar{p}_{Far}$ and the associated cell index ($ID_{out}$) are calculated (step 2):

$$p_{FarX}=O_X+\text{far}*d_X$$

$$p_{FarY}=O_Y+\text{far}*d_Y$$

$$p_{FarZ}=O_Z+\text{far}*d_Z$$

The cell index $ID_{out}$ (0-7) in decimal form is produced again corresponding to the bitmask bitmask (bit2 bit1 bit0) with:

$$\text{bit0}=p_{NearX}>\text{plane}X$$

$$\text{bit1}=p_{NearY}>\text{plane}Y$$

$$\text{bit2}=p_{NearZ}>\text{plane}Z$$

For a prescribed beam which intersects the parent octant at all (if for instance a>0), the following traversing sequences are now possible:

1) The beam passes through only the entry cell or the exit cell (entry cell and exit cell are therefore identical). This corresponds to the case that the number of intersected child octants is equal to 1 (a=
2) The beam passes through the entry cell and then the exit cell, the latter not being identical to the entry cell (a=2).
3) The beam passes through the entry cell, a further cell which is disposed between the entry cell and the exit cell and then the exit cell (a=3).
4) The beam passes through the entry cell, two further intermediate child cells and then the exit cell (a=4).

The complex cases a=3 and a=4 (i.e. 3) and 4)) are achieved according to the invention now with the help of two pre-calculated look-up tables which are stored in the memory (Table 3 and Table 4, see FIGS. 3 and 4). Table 3 is hereby configured as a one-dimensional array of integer numbers, Table as a two-dimensional array of integer numbers. In the presented case, the LUT 3 comprises 64 bytes and LUT 4 128 bytes.

The treatment of the individual possible cases 1) to 4) takes place hereby in a third step firstly such that the bitmasks $ID_{in}$ and $ID_{out}$ which identify the entry and the exit octants, are subjected to a bitwise XOR cross-linkage (see also subsequently presented pseudo code). If during the transformation of the three-place result-bitmask into a corresponding decimal number the value zero is produced, then the case a=1 is present; no further child octants require to be identified. If the decimal number 1, 2 or 4 is produced as result value, then the case a=2 is present, likewise no further child octants require to be identified. However if the decimal numbers 3, 5 or 6 are produced, then the case a=3 is present. In this case, an intermediate cell between entry and exit cell must thus be identified. This takes place as explained more precisely in the subsequent pseudo code in that, from the coordinates of the dividing planes of the parent octant (division coordinates), planeX, planeY and planeZ and also the coordinates of the entry point and of the beam direction, distance values are calculated. For each of the three possible results of the XOR operation (3, 5 or 6), respectively distance values are calculated here in two spatial directions (e.g. in the case where the result value of the XOR operation is 3, distance values DistX and DistY, see pseudo code). By means of the distance values, an offset value is then calculated by a boolean operation. From this offset value and the index of the entry cell, a table index value is calculated, by means of which the corresponding storage point of the first look-up table array Table3 is accessed. The precise form of the calculation, as is disclosed in the subsequent pseudo code, depends of course upon the exact indexing sequence, as is represented merely by way of example in illustration 1. However it is readily possible for the person skilled in the art to adapt the corresponding calculations to a correspondingly altered indexing.

Likewise, in the case of a=4 (result value of the XOR operation here 7) as is represented more precisely in the subsequent pseudo code, the distance values are calculated in all three spatial directions. From these, by cyclical alternating cross-linkages of respectively two distance values, three bit values are then calculated by a boolean operation, by means of which bit values (3-place bitmask) a corresponding offset value is calculated. By means of this offset value and also the entry octant, a table index is calculated, by means of which the second, two-dimensional look-up table is accessed in order to identify the two child octants which are intersected in addition by the beam.

The pseudo code which represents the previously described calculation in detail in the embodiment is represented subsequently.

There are in total 8 different cases which can be differentiated by means of a simple XOR cross-linkage.

--- cFlag = $ID_{in}$ xor $ID_{out}$
/*pseudo code*/
switch(cFlag)
case 0:
/*Sequence 1.) corresponding to a = 1. No further operations required*/
break
case 1:
case 2:
case 4:

-continued

```
/*Sequence 2.) corresponding to a = 2. No further operations required*/
break
case 3:
/*Sequence 3.) corresponding to a = 3. Index ID_Mid of the included cell
must be calculated*/
distX = (planeX - p_NearX) * dInv_X
distY = (planeY - p_NearY) * dInv_Y
offset = (distX < dist Y)
ID_Mid = table3 [ID_in * 8 + 4 + offset]
Break
case 5:
/*Sequence 3.) corresponding to a = 3. Index ID_Mid of the included cell
must be calculated*/
distX = (planeX - p_NearX) * dInv_X
distZ = (planeZ - p_NearZ) * dInv_Z
offset = (distZ < distX)
ID_Mid = table3 [ID_in * 8 + 2 + offset << 2]
break
case 6:
/*Sequence 3.) corresponding to a = 3. Index ID_Mid of the included cell
must be calculated*/
distY = (planeY - p_NearY) * dInv_Y
distZ = (planeZ - p_NearZ) * dInv_Z
offset = (distY < distZ)
ID_Mid = table3 [ID_in * 8 + 1 + offset<< 1]
break
case 7:
/*Sequence 4.) corresponding to a = 4. Index ID_Mid1 and ID_Mid2 of the
included cells must be calculated*/
distX = (planeX - p_NearX) * dInv_X
distY = (planeY - p_NearY) * dInv_Y
distZ = (planeZ - p_NearZ) * dInv_Z
bit0 = (distX < distY)
bit1 = (distY < distZ)
bit2 = (distZ < distX)
offset = bitmask(bit2 bit1 bit0)
ID_Mid1 = table4 [ID_in * 8 + offset] [0]
ID_Mid2 = table4 [ID_in * 8 + offset] [1]
break
}/* end of switch*/
```

Subsequently, the method according to the invention is represented in addition with reference to some concrete application cases:

The previously described octree traversing method can be used within the framework or as a component of various application methods (for example method of collision recognition, sorting methods, search methods, volume rendering methods, ray tracing methods, calculation of energy distributions in space etc., see also previous representations). The real problems hereby to be simulated nowadays produce, because of the large quantity of data, complex deep trees which must be traversed generally from many points. Hence a great number of traversing steps is required. The proposed method with the LUT or LUTs hereby reduces the complexity per traversing step significantly in comparison with methods which do not use look-up tables. In addition, the look-up tables can be converted easily into hardware because of their size (1-4 cache lines on current systems) and the simplicity of the algorithm (e.g. fpga, sit-cell etc.).

In general it hereby applies that the tree is no longer subdivided (establishment of the tree depth)
  if an established previously defined depth is achieved (user-defined depth),
  if the tree has reached a user-defined data size and/or
  if a threshold value (generally number of objects per leaf) is achieved (data for technical applications can only be stored in the leaves).

The spatial position of the objects influences or defines hereby the position of the dividing planes PlaneX, PlaneY, PlaneZ.

For the technical and/or physical parameters or data which are stored in the octree leaves or octants, the following examples can be cited:

in the case of application for collision recognition: for example object references,
in the case of shadow calculation: for example graphic objects (polygons) and positions of light sources and
in the case of visualisation: for example energy proportions per sub-volume (radiation energy of all emitters).

In order to make the previously described octree traversing method usable in concrete applications, it can be necessary to introduce in addition calculation steps which are well known to the person skilled in the art in the corresponding field. For example, it can be necessary to achieve in addition sectional calculations, beam object or integrations of physical values (such as for example of energy sources at scanning points along the beam).

The invention claimed is:

1. A method performed by a processor of a computer for identification of child octants of a parent octant, which are intersected by a beam, in an octree data structure, comprising the steps of:
    establishing a number, a, of the child octants of the parent octant which are intersected by the beam; and
    identifying, when a=3 and a=4, the child octants which are intersected by the beam using at least one pre-calculated and previously stored look-up table (LUT),
    wherein when a=3, a first LUT and when a=4 a further, second LUT is used for identification of the child octants which are intersected by the beam.

2. The method according to claim 1, wherein a one-dimensional LUT is used as the first LUT, and a two-dimensional LUT is used as the second LUT.

3. The method according to claim 1, further comprising: establishing an entry octant (Index $ID_{in}$) and an exit octant (Index $ID_{out}$) of the beam; and, on the basis of this determination, the number, a, is established and the intersected child octants of the parent octant are identified.

4. The method according to claim 3, wherein:
    a) with a=1 the entry octant,
    b) with a=2 the entry and the exit octant,
    c) with a=3 the entry, the exit octant and precisely one further child octant (Index $ID_{Mid}$) of the parent octant,
    d) with a=4 the entry, the exit octant and precisely two further child octants (Indices $ID_{Mid1}$ and $ID_{Mid2}$) of the parent octant,
    are identified as child octants of the parent octant which are intersected by the beam.

5. The method according to claim 3, wherein:
    the entry octant is indexed by means of a three-place bitmask $ID_{in}$;
    the exit octant is indexed by means of a three-place bitmask $ID_{out}$; and in that the number a is established via a bitwise XOR cross-linkage of these bitmasks.

6. The method according to claim 5, wherein:
    the coordinates of the entry point of the beam into the entry octant (entry coordinates) and the coordinates of the exit point of the beam from the exit octant (exit coordinates) are calculated,
    the bitmask $ID_{in}$ is calculated by means of a size comparison of the entry coordinate with the coordinates of dividing planes of the parent octant (division coordinates) and the bitmask $ID_{out}$ is calculated by means of a size comparison of the exit coordinates with the coordinates of the dividing planes of the parent octant and
    when a=3 or a=4, the LUT is indexed by means of a value calculated from the entry coordinates and/or exit coordinates and/or the index $ID_{in}$ and/or the index $ID_{out}$, and the division coordinates for identification of the further intersected child octant or octants $ID_{Mid}$ or $ID_{Mid1}$ and $ID_{Mid2}$.

7. The method according to claim 1, wherein the child octants of the parent octant are indexed by an ordered sequential subdivision of the space according to (x, y, z) coordinates of a left-handed Cartesian coordinate system.

8. The method according to claim 1, wherein the dividing planes of the parent octant are disposed isotropically or anisotropically.

9. The method according to claim 1, wherein the method is a component of a method for graphic display of surface views of objects by means of the computer, of a method for indexing three-dimensional spatial regions in information systems, in particular in geographical information systems, of a method for removing concealed surface components (hidden surface removal) in the case of computer-aided display of geographical data, in particular terrain data, of a simulation method for describing the physical behaviour of particle systems, in particular molecule systems, or of solid bodies, of a method for recognising object collisions in computer simulations, in particular in computer games, or of a method for computer-aided sorting of data and/or identification of partial quantities of data within a total quantity of data (sorting and/or search algorithm).

10. A computer system, comprising:
a memory; and
a calculation unit,
wherein the memory unit and the calculation unit are operable for computer-aided identification of child octants of a parent octant, which are intersected by a beam, in an octree data structure, comprising:
establishing a number, a, of the child octants of the parent octant which are intersected by the beam; and
identifying, when a=3 and a=4, the child octants which are intersected by the beam using at least one pre-calculated and previously stored look-up table (LUT),
wherein when a=3, a first LUT and when a=4 a further, second LUT is used for identification of the child octants which are intersected by the beam.

11. The computer system of claim 10, wherein the memory unit and a calculation unit are operable for graphic display of surface views of objects, for indexing three-dimensional spatial regions in information systems, in particular in geographical information systems, for removing concealed surface components in the computer-aided display of geographical data, in particular terrain data, for simulation of the physical behaviour of particle systems, in particular molecule systems, or of solid bodies, for recognition of object collisions in computer simulations, in particular in computer games or for sorting data and/or identifying partial quantities of data within a total quantity of data.

* * * * *